(12) United States Patent
Hendriksen et al.

(10) Patent No.: US 8,859,116 B2
(45) Date of Patent: Oct. 14, 2014

(54) MULTI-LAYER COATING

(75) Inventors: Peter Vang Hendriksen, Hilleroed (DK); Lars Mikkelsen, Roskilde (DK); Peter Halvor Larsen, Roskilde (DK); Soeren Linderoth, Roskilde (DK); Mogens Mogensen, Lynge (DK)

(73) Assignee: Technical University of Denmark, Kgs. Lyngby (DK)

( * ) Notice: Subject to any disclaimer, the term of this patent is extended or adjusted under 35 U.S.C. 154(b) by 1030 days.

(21) Appl. No.: 12/298,458

(22) PCT Filed: Apr. 24, 2007

(86) PCT No.: PCT/EP2007/003593
§ 371 (c)(1),
(2), (4) Date: Feb. 20, 2009

(87) PCT Pub. No.: WO2007/121986
PCT Pub. Date: Nov. 1, 2007

(65) Prior Publication Data
US 2010/0015473 A1    Jan. 21, 2010

(30) Foreign Application Priority Data
Apr. 26, 2006 (EP) .................................... 06008678

(51) Int. Cl.
*H01M 8/02* (2006.01)
*H01M 6/42* (2006.01)
(Continued)

(52) U.S. Cl.
CPC .......... *H01M 8/1286* (2013.01); *H01M 8/0228* (2013.01); *Y02E 60/525* (2013.01); *Y02E 60/521* (2013.01); *H01M 8/0232* (2013.01);
(Continued)

(58) Field of Classification Search
None
See application file for complete search history.

(56) References Cited

U.S. PATENT DOCUMENTS

| 4,849,085 A | 7/1989 | Debrodt et al. |
| 5,876,866 A * | 3/1999 | McKee et al. ................. 428/699 |

(Continued)

FOREIGN PATENT DOCUMENTS

| DE | 196 27 504 C1 | 10/1997 |
| DE | 103 06 649 A1 | 9/2004 |

(Continued)

OTHER PUBLICATIONS

Larring et al. J. Electrochemical Soc. 2000, 147 (9), 3251-3256.*

*Primary Examiner* — Vera Katz
(74) *Attorney, Agent, or Firm* — Seed IP Law Group PLLC

(57) ABSTRACT

A multi-layer coating for protection of metals and alloys against oxidation at high temperatures is provided. The invention utilizes a multi-layer ceramic coating on metals or alloys for increased oxidation-resistance, comprising at least two layers, wherein the first layer (3) and the second layer (4) both comprise an oxide, and wherein the first layer (3) has a tracer diffusion coefficient for cations $M^{m+}$, where M is the scale forming element of the alloy, and the second layer (4) has a tracer diffusion coefficient for oxygen ions $O^{2-}$ satisfying the following formula:

$$\int_{\ln p(O_2)_{in}}^{\ln p(O_2)_{ex}} \left(D_O + \frac{m}{2}D_M\right) d\ln p(O_2) < 5 \cdot 10^{-13} \text{ cm}^2/s$$

wherein $p(O_2)_{in}$, $p(O_2)_{ex}$, $D_M$ and $D_O$ are as defined herein. The coating may be used in high temperature devices, particularly for coating interconnect materials in solid oxide electrolytic devices, including solid oxide fuel cells (SOFCs) and solid oxide electrolysis cells (SOECs).

16 Claims, 1 Drawing Sheet

(51) Int. Cl.
  *B32B 7/02* (2006.01)
  *B32B 9/00* (2006.01)
  *B05D 3/14* (2006.01)
  *B05D 1/36* (2006.01)
  *C23C 16/40* (2006.01)
  *C23C 14/34* (2006.01)
  *H01M 8/12* (2006.01)
  *H01M 4/90* (2006.01)

(52) U.S. Cl.
  CPC ......... *H01M 8/0215* (2013.01); *H01M 4/9033* (2013.01); *H01M 8/0217* (2013.01); *H01M 8/0245* (2013.01); *H01M 2008/1293* (2013.01)
  USPC .......... 428/701; 428/702; 428/212; 429/149; 429/12; 427/115; 427/454; 427/576; 427/475; 204/192.15

(56) References Cited

U.S. PATENT DOCUMENTS

| | | | |
|---|---|---|---|
| 5,939,219 A | 8/1999 | Jansing et al. | 429/32 |
| 5,942,349 A * | 8/1999 | Badwal et al. | 429/495 |
| 6,074,772 A | 6/2000 | Hofer et al. | 429/40 |
| 6,127,048 A | 10/2000 | Beele | 428/623 |
| 6,764,771 B1 | 7/2004 | Heimberg et al. | |
| 6,797,662 B1 | 9/2004 | Jaffrey | 501/153 |
| 6,887,044 B2 | 5/2005 | Fleck et al. | 416/241 B |
| 7,190,568 B2 * | 3/2007 | Wood et al. | 361/320 |
| 7,407,717 B2 | 8/2008 | Tietz et al. | 428/701 |
| 2003/0194592 A1 | 10/2003 | Hilliard | 429/32 |
| 2006/0107891 A1* | 5/2006 | Zurbuchen | 117/92 |
| 2006/0234066 A1* | 10/2006 | Zurbuchen | 428/450 |
| 2008/0241581 A1* | 10/2008 | Zurbuchen | 428/640 |
| 2009/0029187 A1* | 1/2009 | Schuisky et al. | 428/685 |
| 2009/0035561 A1* | 2/2009 | Gopalan et al. | 428/336 |
| 2010/0015473 A1* | 1/2010 | Hendriksen et al. | 429/12 |
| 2010/0119886 A1* | 5/2010 | Nielsen et al. | 429/13 |

FOREIGN PATENT DOCUMENTS

| | | |
|---|---|---|
| EP | 1 788 653 A1 | 5/2007 |
| JP | 62-270790 | 11/1987 |
| JP | 2-50983 | 2/1990 |
| JP | 3-138373 | 6/1991 |
| JP | 2000-515202 A | 11/2000 |
| JP | 2001-279473 | 10/2001 |
| JP | 2001-521993 A | 11/2001 |
| JP | 2002-534769 | 10/2002 |
| JP | 2004-526094 | 8/2004 |
| JP | 2006-32183 A | 2/2006 |
| WO | WO 03/026052 A1 | 3/2003 |
| WO | WO 2006/016628 A1 | 2/2006 |
| WO | WO 2006/059942 A1 | 6/2006 |
| WO | WO 2006/059943 A1 | 6/2006 |

* cited by examiner

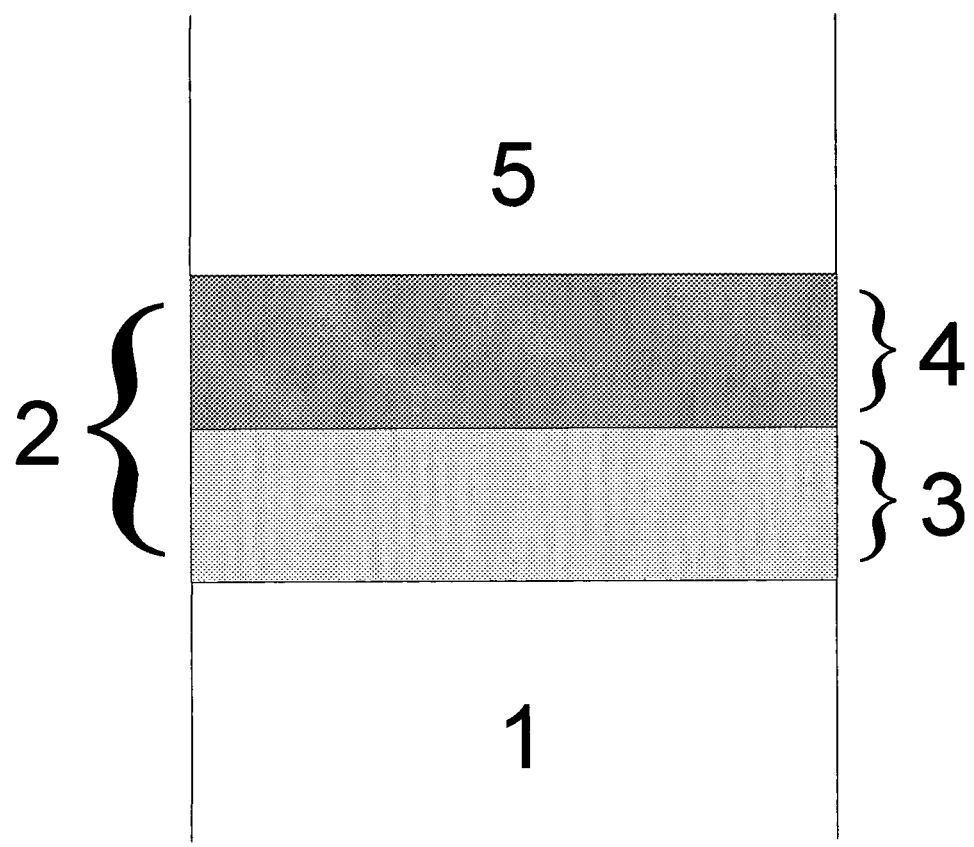

MULTI-LAYER COATING

FIELD OF THE INVENTION

The present invention relates to a multi-layer coating for the protection of metals and metal alloys against oxidation at high temperatures. The coating may be used in high temperature devices, particularly for coating interconnect materials in solid oxide electrolytic devices, including solid oxide fuel cells (SOFCs) and solid oxide electrolysis cells (SOECs).

BACKGROUND ART

Applications of solid oxide electrolytic devices include the power generation by SOFCs and production of fuel gases by SOECs. In both devices, SOFCs and SOECs, individual cells are stacked together, with interconnect plates separating the cells, so as to obtain a higher energy output by electricity or by fuel gases, respectively. The interconnect plates separate the fuel gas from the oxidant, which is typically air, and furthermore function as the electrical connection between individual cells in a stack.

Hence, the requirements for an interconnect plate include long term durability, i.e. high oxidation resistance in an oxidizing and reducing atmosphere at high temperatures, i.e. above 500° C., good electrical conductivity in an oxidizing and reducing atmosphere at high temperatures, further a thermal expansion coefficient (TEC) matching with the cell.

Commonly, metallic materials are employed as interconnect materials, since they possess a high thermal and electrical conductivity, are available at low costs and easy to machine.

However, during aging under operation conditions, oxides form on both sides of the metallic interconnect. The growth of said oxides disadvantageously leads to an increased electrical resistance across the interconnect plate and, thus, increased power loss. Therefore, high temperature resistant alloys have been suggested, which contain Si, Al and/or Cr, which form a dense $SiO_2$ (silica), $Al_2O_3$ (alumina) or $Cr_2O_3$ (chromia) protective oxide layer. Especially alloys forming a chromia layer during operation have been investigated as interconnects due to a good balance of the oxidation kinetics and electrical conductivity of chromia, as compared to silica and alumina. Based on all requirements of the interconnect, ferritic iron-chromium alloys and chromium-rich alloys have so far been considered as the most promising interconnect materials.

U.S. Pat. No. 5,608,174 discloses an oxide dispersion strengthened chromium-rich alloy, having a chromium content of more than 65% by weight. Said alloy forms a chromia scale during aging under operation. The growth rate of chromia at operation temperatures>800° C. is however too high, which in turn results in the electrical resistance across the interconnect plate reaching unacceptable high values due to the low conductivity of chromia.

A further problem when using chromia-forming alloys as interconnects is the evaporation of chromium containing oxides and oxy-hydroxides on the air side of the interconnect during operation. Said evaporation leads to deposition of chromium-containing oxides at the air-electrode-electrolyte interface, which decreases the electrode performance in the long term. This phenomenon is known as "chromium poisoning".

Attempts to avoid the high electrical resistance and chromium poisoning from the chromia scale have been made by designing alloys which form a duplex $Cr_2O_3$—$(Mn,Cr)_3O_4$ oxide scale, with the manganese chromium spinel positioned above a layer of chromia.

US-A1-2003/0059335 proposes a chromium oxide forming iron-based alloy, comprising 12 to 28 wt % chromium and small amounts of La, Mn, Ti, Si, and Al. The material is capable of forming at its surface a $MnCr_2O_4$ spinel phase at temperatures of 700° C. to 950° C.

EP-B-1298228 relates to a steel material suitable as an interconnect material for fuel cells, the material comprising 15 to 30 wt % Cr and forming oxide films having good electrical conductivity at 700° C. to 950° C.

The formed manganese chromium spinel has advantageously a lower vaporization pressure for chromium containing species than chromia itself, and a higher electrical conductivity. However, the chromium containing spinel still evaporates chromium containing species, and thus a sufficient protection cannot be realized. Moreover, Cr-diffusion is in fact faster in the spinel than in the chromia and thus the formation of a dublex scale leads to an increased rate of the corrosion, thereby reducing the overall lifetime of the device.

It has been further suggested to modify the oxide scale grown on the alloy by applying coatings on the surface of the alloy instead of using the alloy alone. Said coatings may reduce the growth rate of the oxide scale, increase the electrical conductivity of the grown oxide, and reduce the chromium evaporation from the interconnect. The coating of the alloys may, for example, be performed by applying a dense coating on the interconnect, or may be done by applying a porous coating.

U.S. Pat. No. 6,054,231 discloses the application of a metallic coating on the chromium-containing interconnect. The coated interconnect will form a conductive oxide layer containing chromium during aging. The metallic coating is considered to be a sink for chromium diffusing outwards from the alloy.

The proposed coating, however, does not stop chromium containing species from diffusing further outwards from the alloy. Therefore, metallic coatings forming a chromium containing oxide do not act as an effective diffusion barrier towards chromium diffusion. Instead, the metal coating merely impedes the chromium diffusion during the initial stages of the oxidation. Furthermore, the metallic coating does not solve the problem regarding chromium poisoning.

U.S. Pat. No. 5,942,349 proposes to deposit an oxide coating on the interconnect such that a layer of chromium containing spinel is formed in a reaction between a chromia scale formed on the interconnect and the applied oxide coating. The coating initially impedes chromium poisoning of the cathode by catching chromium from the interconnect in the coating forming the spinel.

However, the proposed coating does also not act as a sufficient diffusion barrier for chromium from the interconnect. The oxide layer formed on the interconnect will continue to grow in thickness and thereby result in an increasing electrical resistance across the interconnect plate. Furthermore, Cr-poisoning will occur during long term operation, since the formed spinel becomes itself chromium rich and the respective oxides evaporate therefrom into the air-electrode-electrolyte interface.

Coatings of a similar kind, where a spinel is formed in a reaction between the interconnect and an oxide coating have been proposed in DE-A1-10306649. Said spinel is initially chromium free due to a reaction between the alloy and a spinel forming element in the coating.

However, this coating nevertheless suffers from the above described problems, since the chromium transport from the alloy is not entirely stopped and the reaction layer, although being initially free from chromium, will eventually contain chromium. Thus, Cr-poisoning and increasing electrical resistance will be the result during long term operation. Said coating is, thus, not suitable for applications requiring a very long durability of SOFC and SOEC stacks.

Furthermore, porous coatings of conductive oxides with a perovskite structure have been applied on interconnects as coatings to increase the electrical conductivity of the formed oxide scale and to stop the chromium poisoning, as described in e.g. Y. Larring et al., Journal of the Electrochemical Society 147 (9); 3251-3256 (2000). These coatings have the same drawbacks as mentioned in the above examples.

US-A1-2003/0194592 discloses an interconnect structure for solid oxide electrolytic devices with a coating consisting of two layers. The first layer comprises a Cr-containing electronic conductive oxide covered by a second layer, which acts as a diffusion barrier for oxygen. The second layer also stops chromium diffusion from the first layer. The second layer is a metallic layer, preferably a platinum layer. However, platinum is undesirably expensive, making a commercialization of SOFC and SOEC technology cumbersome.

WO-A1-2006/059942 relates to a strip for use as an electrical contact consisting of a metallic base material which is coated with a metallic layer based on a metal or metal alloy, and further with at least one reactive layer containing at least one element or compound which forms a spinel and/or perovskite structure with the metal or metal alloy when oxidized.

The metal layer coating allows a tailor made perovskite/spinel layer due to a precise control the amount of different elements contained in the metal layer so as to be independent from the composition of the metallic base material. When oxidized, a single perovskite/spinel layer is formed on the metallic base material, which provides a surface with high electrical conductivity and a low contact resistance. Said layer is however insufficient to prevent the further growth of the oxide layer during operation. Furthermore, if a chromium-containing metallic material is employed either as the metallic base material or as a component of the metallic layer, chromium-poisoning will still occur.

WO-A1-2006/059943 discloses a fuel component consisting of a metallic base material coated with at least one metallic layer based on a metal or metal alloy, and at least one reactive layer comprising at least one element or compound which forms at least one complex mixed oxide with the metal or metal alloy when oxidized.

The precise composition of the coating can be tailor-made to achieve the exact formation of the wanted complex metal oxide structure which may be in form of a spinel, perovskite and/or any other ternary or quaternary metal oxide structure upon oxidation with the desired properties, such as good conductivity and good corrosion resistance.

However, the formed oxide layer is insufficient to prevent the further growth of the oxide layer during operation of the fuel component. If furthermore a chromium-containing metallic material is employed as the metallic base material or metallic coating layer, chromium-poisoning will still occur.

The long term durability of the interconnects described in the prior art up to date is not sufficient for many applications. The use of specifically designed alloys for interconnect materials does not eliminate the problem of oxide growth on the interconnect, considerably resulting in an insufficient life time when the interconnects are used in solid oxide cells or the like. Moreover, if chromium-containing metallic materials are employed, which are so far the most preferred materials for interconnects, chromium poisoning of the electrode will still occur; the use of the so far proposed coatings on said alloys cannot eliminate the undesired oxide growth, and does not prevent chromium poisoning. Further, the use of expensive metals, such as platinum, although leading to better results, is not feasible for the commercial potential of solid state devices, such as SOFCs and SOECs, due to the high price.

Alloys utilized for high temperature applications often form a protective silica layer, alumina layer or chromia layer to protect the alloy against further oxidation. Coatings to be applied on alloys to increase the oxidation protection have been suggested in prior art. These include coatings in the ternary phase system Ni—Pt—Al, MCrAlY coatings, TBC coatings, diffusion coatings etc. as described in e.g. J. R. Nicholls, JOM-Journal of the Minerals Metals & Materials Society 52 (1); 28-35 (2000).

Object of the Present Invention

It is the object of the present invention to overcome the problems of the prior art coatings and to provide a multi-layer coating suitable for metal containing surfaces for high temperature applications, the coating ensuring a long term durability of, for example, metallic interconnects in SOECs and SOFCs, to provide a SOEC and a SOFC comprising said coating, and further to provide a method for producing said coating.

BRIEF DESCRIPTION OF THE INVENTION

The above object is achieved by a multilayer coating suitable for metal containing surfaces comprising at least two layers,
wherein the first layer (3) which faces the metal containing surface and the second layer facing the surrounding atmosphere (4) both comprise an oxide, and
wherein the first layer (3) has a tracer diffusion coefficient for cations $M^{m+}$, (M is the scale forming element of the alloy), and the second layer (4) has a tracer diffusion coefficient for oxygen ions $O^{2-}$ satisfying the following formula:

$$\int_{\ln p(O_2)_{in}}^{\ln p(O_2)_{ex}} \left(D_o + \frac{m}{2}D_M\right) d\ln p(O_2) < 5 \cdot 10^{-13} \text{ cm}^2/s$$

wherein $p(O_2)_{in}$ is the oxygen partial pressure in equilibrium between the metallic substrate and $M_aO_b$, $p(O_2)_{ex}$ is the oxygen partial pressure in the reaction atmosphere, $D_M$ is the tracer diffusion coefficient of the metal cations $M^{m+}$ in the first layer (3), and $D_O$ is $O^{2-}$ tracer diffusion coefficient in the second layer (4).

Said object is further achieved by a method of forming the above multilayer coating comprising the steps of:
  forming the first layer (3) on the metal surface; and
  depositing the second layer (4) on the first layer (3).
Said object is finally achieved by a solid oxide fuel cell stack and a solid oxide electrolysis cell stack comprising the above multilayer coating.
Preferred embodiments are set forth in the subclaims.

FIGURES

The invention will in the following be explained with reference to FIG. 1 which illustrates a multi-layer coating in accordance with the present invention.

DETAILED DESCRIPTION OF THE INVENTION

In the following, the invention will be described in more detail.

The multilayer coating suitable for metal containing surfaces in accordance with the present invention comprises at least two layers,
wherein the first layer (3) which faces the metal containing surface and the second layer facing the atmosphere (4) both comprise an oxide, and
wherein the first layer (3) has a tracer diffusion coefficient for cations $M^{m+}$, (where M is the scale forming element of the alloy), and the second layer (4) has a tracer diffusion coefficient for oxygen ions $O^{2-}$ satisfying the following formula:

$$\int_{\ln p(O_2)_{in}}^{\ln p(O_2)_{ex}} \left(D_o + \frac{m}{2} D_M\right) d\ln p(O_2) < 5 \cdot 10^{-13} \text{ cm}^2/\text{s}$$

wherein $p(O_2)_{in}$ is the oxygen partial pressure in equilibrium between the metallic substrate and $M_aO_b$, $p(O_2)_{ex}$ is the oxygen partial pressure in the reaction atmosphere, $D_M$ is the tracer diffusion coefficient of the metal cations $M^{m+}$ in the first layer (3), and $D_O$ is $O^{2-}$ tracer diffusion coefficient in the second layer (4).

The first layer (3) is capable of minimizing the outward diffusion of cations, while the second layer (4) minimizes the inward diffusion of oxygen ions. Due to said structure, oxide scale growth on the metal containing surfaces can be effectively suppressed.

In the above formula, the tracer diffusion coefficient for cations and the tracer diffusion coefficient for oxygen ions satisfy said formula in a temperature range of from about 500 to about 1000° C. While the coefficients may satisfy said below and/or above said temperature range, depending on the respective values, it is however not critical for the present invention.

The oxygen tracer diffusion coefficient as referred to throughout the present invention can be measured in independent tests, as described in detail in R. A. De Souza et al., Solid State Ionics, 106 (3-4): 175 (1998). The coefficient is determined by means of the Isotopic Exchange Depth Profile method (IEDP). $^{18}O/^{16}O$ exchange anneals are performed at different temperatures at $P_{O2}$ of about 1 atm, and the subsequent $^{18}O$ diffusion profiles are determined by Secondary Ion Mass Spectroscopy (SIMS).

The cation tracer diffusion coefficient as referred to throughout the present invention can be measured by SIMS, as described in O. Schulz et al., Physical Chemistry Chemical Physics, 5 (11): 2008 (2003).

How to measure said tracer diffusion coefficients is furthermore well known to a person skilled in the art.

Referring to FIG. 1, a system in accordance with the present invention is illustrated, having a multi-layer coating (2) on top of the metallic substrate, (1) for example a metallic interconnect. The multi-layer coating comprises a layer (3) closest to the interconnect and a layer (4) closest to the atmosphere of exposure (5). The layer closest to the interconnect has the property to inhibit cation diffusion, while the layer closest to the atmosphere has the property to inhibit transport of oxygen (molecules and ions). The coated interconnect may be preferably used in applications working in the temperature range of 500-1000° C.

The invention is based on the principle that oxygen ions diffuse from the atmosphere, while cations $M^{m+}$ diffuse from the metallic surface such that an oxide $M_aO_b$ will be formed. Due to the respective diffusion coefficients of the first and second layer satisfying the above formula, the growth of the oxide can be effectively reduced.

The first layer (3) which faces the metal surface comprises an oxide and preferably has a low cation tracer diffusion coefficient, i.e. less than $10^{-15}$ cm$^2$/s, and more preferably less than $10^{-17}$ cm$^2$/s.

The second layer (4) comprises an oxide and preferably has an oxygen ion tracer diffusion coefficient of less than $10^{-15}$ cm$^2$/s, more preferably of less than $10^{-17}$ cm$^2$/s.

In a preferred embodiment, the cation tracer diffusion coefficient is the chromium tracer diffusion coefficient of the respective layer.

According to a preferred embodiment, oxides with a perovskite structure or fluorite structure may be used as layer (3) closest to the metallic substrate, since oxides with a perovskite structure or fluorite structure are generally poor cation conductors.

According to the invention, the perovskite can be any perovskite of the formula ABO$_3$, where A, and B are cations. A is a member of the "scandium family" (Y, La and the lanthanides (Ce to Yb)) or an alkaline earth element (Mg, Sr, Ca, Ba), or mixtures thereof, and B is a transition metal belonging to either the first or second series, or Ce, Al, Ga, Sn, In, or a mixture thereof. Preferably B is selected from the group consisting of Ti, V, Cr, Mn, Fe, Co, Ni, Cu, Zn, Zr, Nb, Mo and Ce. Of particular interest are the perovskites with B=Ti, V, Cr and Fe.

Preferred perovskites are selected from the group consisting of LaCrO$_3$, YCrO$_3$, SrTiO$_3$, LaTiO$_3$, YTiO$_3$, LaFeO$_3$, YFeO$_3$, LaVO$_3$ and YVO$_3$, optionally doped with Sr, Ca, Ba and/or Mg. It is also preferred that the perovskite is composed of SrVO$_3$, (La,Sr)VO$_3$ or (La,Sr)(Cr,V)O$_3$. In a preferred embodiment the perovskite is composed of SrTiO$_3$ which is optionally doped with Nb or La.

According to the invention, the fluorite can be any fluorite of the formula AO$_2$ where A is a cation. Preferred fluorites are selected from the group consisting of stabilized zirconia (yttria, calcia, or magnesia stabilized zirconia).

In a further preferred embodiment, layer (4), being closest to the exposing atmosphere, comprises an oxide having a spinel structure, a rock salt structure, a corundum structure, or a wurtzite structure since oxides having a said structures are generally poor oxygen ion conductors.

According to the invention, the spinel can be any spinel of the formula AB$_2$O$_4$, where A and B are transition metals belonging to either the first or second series, or Ce, Al, Ga, Sn or In, or a mixture hereof. Preferably, A and B are selected from the group consisting of Ti, V, Cr, Mn, Fe, Co, Ni, Cu, Zn, Zr, Nb, Mo, Ce, and mixtures thereof. Of particular interest are the spinels (Mn, Ni, Co, Cr, Fe, Cu)$_3$O$_4$, with (Mn,Cr,Co)$_3$O$_4$ being most preferred.

According to the invention, the rock salt can be any rock salt of the formula AB, where A is a cation and B is oxygen. Particularly preferred are rock salts selected from the group consisting of CaO, SrO, BaO, FeO, CoO, CdO, MgO, and NiO.

According to the invention, the corundum can be any corundum of the formula A$_2$B$_3$, where A is a cation and B is oxygen. Particularly preferred are corundums selected from the group consisting of α-Al$_2$O$_3$, Ti$_2$O$_3$, V$_2$O$_3$, α-Mn$_2$O$_3$, α-Ga$_2$O$_3$, and α-Fe$_2$O$_3$.

According to the invention, the wurtzite can be any wurtzite of the formula AB, where A is a cation and B is oxygen. Particularly preferred are wurtzites selected from the group consisting of BeO, ZnO.

In a more preferred embodiment of the invention, layer (4) of the coating comprises a spinel in combination with layer (3) comprising a perovskite. Said combination is especially suitable as a multi-layer coating for interconnects in SOFCs and SOECs due to a reasonable high electronic conductivity of oxides with the spinel and the perovskite structure, for a large range of different element combinations. The spinel structure inhibits oxygen diffusion whereas the perovskite structure inhibits cation diffusion from the interconnect though the layer. Also preferred for metallic interconnects in SOFCs and SOECs is layer (4) of the coating comprising a rock salt in combination with layer (3) comprising a perovskite. The rock salt structure also efficiently inhibits oxygen diffusion, as described for the spinel structure above.

For high temperature applications, it is further preferred that layer (3) of the coating comprises a perovskite in combination with layer (4) comprising a corundum structure, or layer (4) comprising a wurtzite structure.

Alternatively, preferred for high temperature applications is layer (3) of the coating comprises a fluorite in combination with layer (4) comprising a rock salt structure, a corundum structure, a wurtzite structure, or a spinel structure.

Therewith, oxide growth is efficiently inhibited on the metal containing surface, contributing to a longer life time of the high temperature application comprising the coated metal containing layer.

The exact combination of specific materials depends on the respective tracer diffusion coefficients. If the diffusion of cations through layer (3) is very low, the requirements for the transport properties of layer (4) become relatively easy to fulfill (c.f. the equation above). This allows for more freedom regarding the materials for each layer for a given metal containing surface in the light of the desired application.

The above compositions of the spinel and perovskites are listed as stoichiometric oxides. The stoichiometry of the materials utilized in the multi-layer coat can, however, be non-stoichiometric without departing from the scope of the present invention. For example, the perovskite may be sub-stoichiometric, i.e. a perovskite $AB_yO_3$, where y<1, e.g. $LaCr_{0.99}O_3$. In this case, possible oxide scales formed on the interconnect during aging react with the $LaCr_{0.99}O_3$ so that the cations from the oxide scale are incorporated in the perovskite structure on the B-site. As a result the thickness of the thermally grown oxide scale can be reduced. The materials may also be doped with various elements.

The individual oxide layers of the coating may have a graded composition such that the composition varies through the oxide layer. Furthermore, the two oxide layers may be graded such that the composition of the one layer gradually changes into the composition of the other layer. In another preferred embodiment, either oxide layer contains secondary phases, which exist in the grain boundaries of the oxide. The two individual layers can also be a mixture of oxides with low ionic (cation or oxide) transport and oxides exhibiting high electronic conduction.

It is preferred that the coating has two layers. However, additional layers may also be part of the coating besides layers (3) and (4). These layers may be positioned between the interconnect and layer (3), between layer (3) and layer (4), or between layer (4) and the atmosphere. These layers may provide additional properties to the coating, i.e. function as additional diffusion barrier layers, adherence layers, doping layers, strain compensating layers or the like.

In case the multi-layer coating is applied on metallic interconnects for SOFCs and SOECs, both layers in the multi-layer coating are electronically conductive. In a preferred embodiment, the area specific resistance of the coating is less than 0.05 $\Omega cm^2$ at 600° C.

The multi-layer coating may of course be applied on both sides of the interconnect, i.e. on the air and the fuel side of the interconnect, if desired.

The thickness of the multi-layer coating is preferably less than 50 μm, and more preferably less than 20 μm.

The thickness of the first layer (3) is preferably less than 25 μm, and more preferably less than 10 μm.

The thickness of the second layer (4) is preferably less than 25 μm, and more preferably less than 10 μm.

The present invention further provides a method of forming a coating suitable for metal containing surfaces comprising at least two layers, wherein the first layer (3) which faces the metal containing surface and the second layer facing the atmosphere of exposure (4) both comprise an oxide, and wherein the first layer (3) has a tracer diffusion coefficient for cations $M^{m+}$, (M is the scale forming element of the alloy), and the second layer (4) has a tracer diffusion coreficient for oxygen ions $O^{2-}$ satisfying the following formula:

$$\int_{\ln p(O_2)_{in}}^{\ln p(O_2)_{ex}} \left(D_o + \frac{m}{2}D_M\right) d\ln p(O_2) < 5 \cdot 10^{-13} \text{ cm}^2/\text{s}$$

wherein $p(O_2)_{in}$ is the oxygen partial pressure in equilibrium between the metallic substrate and $M_aO_b$, $p(O_2)_{ex}$ is the oxygen partial pressure in the reaction atmosphere, $D_M$ is the tracer diffusion coefficient of the metal cations $M^{m+}$ in the first layer (3), and $D_O$ is $O^{2-}$ tracer diffusion coefficient in the second layer (4);

the method comprising the steps of:
forming the first layer (3) on the metallic substrate; and
depositing the second layer (4) on the first layer (3).

According to a preferred embodiment, oxides with a perovskite structure may be used as layer (3). The perovskite layer may be formed in a reaction between the interconnect and a deposited metal, such as La, Sr, Y, or in a reaction between the interconnect and a deposited metal salt or metal-oxide, such as $Y_2O_3$, SrO, $La_2O_3$, $La_{1-x}Sr_xCoO_3$. Alternatively, any other structure for layer (3) as described above for the dual layer of the present invention may be used.

The oxide may also be deposited on the interconnect by any other method known in the art, including dip coating, slurry spraying, screen printing, spin coating, electroplating, flame spraying, EPD, electrolytic deposition, physical or chemical deposition from an oxide target, sputtering, electrostatic spraying, plasma spraying, laser techniques, or spray pyrolysis.

In another preferred embodiment, layer (4), being closest to the atmosphere of exposure, comprises an oxide having a spinel structure, since oxides having a spinel structure are generally poor oxygen ion conductors. The spinel layer may be formed on top of the perovskite layer in a reaction between the perovskite and precursor materials. Said precursors include metals, metal-salts and oxides. The spinel and the perovskite may also be formed in a reaction during a heat treatment. The spinel layer may be deposited on the perovskite after a heat treatment of the interconnect-perovskite. Alternatively, the spinel layer may be deposited on the perovskite layer without any prior heat treatment of the perovskite layer. The spinel layer may furthermore be deposited on the perovskite layer by similar techniques as described above for the perovskite layer.

Of course, the same applies if oxides other than a perovskite and/or a spinel are employed for layers (3) and (4).

The coating may be formed in air, or alternatively in atmospheres containing less oxygen. The conditions during the formation of the multi-layer coating may also include a sequential treatment in different atmospheres and at different temperatures, depending on the materials used.

The coating may be sintered in air, or alternatively in atmospheres containing less oxygen. The sintering conditions may also include a sequential treatment in different atmospheres and at different temperatures, depending on the materials used.

The surface of the metal containing surface may be treated in various ways prior to deposition of the coating. The treatments include grinding, polishing, pickling, sand blasting, etc. Furthermore, the metal containing surface may be pre-oxidized to form a small amount of oxide prior to coating. The pre-treatment of the metal containing surface may also include pre-oxidation after deposition of oxides, e.g. reactive elements to improve adhesion, or dopants to improve the electrical conductivity and the like.

The metal containing surface may be the surface of any metal or metal alloy. Preferably, the coating of the present invention is applied to surfaces of metal containing interconnects. In another preferred embodiment the metal containing material is a porous metal or metal alloy support.

According to a preferred embodiment, the multi-layer coating is applied on metallic substrates as an oxidation-barrier for metals or alloys such that the coated metal or alloy substrate possesses a high oxidation-resistance. Multi-layer coatings used for interconnects may be utilized for this embodiment as well. In addition, other materials may be utilized in the multi-layer coating for this embodiment, since the multi-layer coating is not necessarily electronically conductive in this case. This opens the possibility of using other ceramic materials.

According to the invention, the diffusion preventing effect is achieved by the combination of at least two separate layers. Thereby, each layer can be optimized with regard to its desired characteristics, cation diffusion prevention and oxygen diffusion prevention, which reduces the minimum requirements for each layer, as compared to a single layer oxide which has to fulfill both properties at the same time. It is thus possible to use a great variety of known electron conducting materials for each layer, which may be tailored depending on the intended purpose.

The coating of the present invention comprises the oxidation resistant properties so far required for metallic substrates during operation, so that the coated metallic substrates do not necessarily need to possess said oxidation resistance properties, i.e. the metallic substrate does not need to grow an oxidation resistant chromia, silica or alumina scale during operation. Instead, the metallic substrate possesses as the minimum requirement only the necessary mechanical properties for the application in question. Therefore, a large freedom with regard to the selection of metals or alloys is given.

Further advantages of the multi-layer coating of the present invention, when applied in SOFCs and SOECs, include the prevention of the problems encountered in the prior art, such as Cr-poisoning, or a large increase of the interface resistance. According to the invention, Cr-poisoning is effectively inhibited and the rate of increase of electrical resistance is strongly reduced.

The coating of the present invention may therefore be advantageously used as coatings for interconnects in SOFCs and SOECs, where the coating can decrease the electrical degradation observed for interconnects and at the same time inhibit chromium poisoning. If the coating is used in SOFC and SOEC applications, the coating must be electronically conductive. However, the coating is not limited to these applications, but may be employed in high temperature oxidation applications in general.

The SOFCs and SOECs, comprising the coating of the present invention, possess an increased lifetime due to less oxidation of the interconnects and less Cr-poisoning of the electrodes. Furthermore, since more flexibility in the choice of the materials for the interconnect and design thereof can be realized, the SOFCs and SOECs are more cost effective.

Furthermore, prior to the deposition or after the deposition of the multi-layer coating, the metallic substrate (interconnect or general metallic substrate) may be shaped, e.g. by pressing methods, or a part of the substrate may be removed, e.g. by etching methods, depending on the desired application.

In the following, the invention will be illustrated by examples. Alternative embodiments and examples exist without departing from the scope of the present invention.

Examples

Example 1

A dual layer coating was deposited on a $Cr_2O_3$-forming Fe-22Cr alloy. The first oxide layer was deposited by PLD on the alloy surface with the composition $La_{0.95}Sr_{0.05}CrO_3$ with a thickness of 5 µm, said composition having a perovskite structure. Afterwards, a 5 µm $MnCr_2O_4$ layer having a spinel structure was deposited on the perovskite layer by PLD so as to form a dual layer coating. The Cr tracer diffusion coefficient for $La_{0.95}Sr_{0.05}CrO_3$ has been measured to be $1.07 \times 10^{-17}$ $cm^2/s$ at 1000° C. (N. Sakai et al., Solid State Ionics, 135 (2000) p. 469). The oxygen tracer diffusion coefficient of the $MnCr_2O_4$ layer has been measured to be $6 \times 10^{-15}$ $cm^2/s$ at 800° C. (N. Sakai et al., Solid State Ionics, 176 (2005) p. 681).

Example 2

A dual-layer coating was formed on a ferritic Fe—Cr interconnect. The first oxide layer was directly deposited on the metal by slurry spraying $LaCrO_3$ having a perovskite structure. Afterwards, a 5 µm thin $MnCr_2O_4$ layer having a spinel structure was deposited on the perovskite layer by PLD so as to form the dual-layer coating.

Example 3

A coating as described in Example 2 was formed, followed by deposition of a layer of $MnCo_2O_4$ by PLD on top of the spinel layer.

Example 4

A dual-layer coating was formed on a Fe—Cr-based interconnect. The first oxide layer was formed by depositing a metallic La layer by PLD, followed by a reaction between the La layer and the interconnect at 1000° C. in air, thereby forming $LaCrO_3$ having a perovskite structure. Afterwards, a thin $MnCr_2O_4$ layer having a spinel structure was deposited on the perovskite layer by PLD.

Example 5

A dual-layer coating was formed on a ferritic alloy. The first oxide layer was formed as described in Example 1, followed by depositing $Mn_2O_3$ on top of the perovskite layer by slurry spraying. Afterwards, a spinel layer was formed by the reaction between the perovskite layer and the deposited oxide at 950° C. in air.

Example 6

Same as Example 5, wherein $Co_3O_4$ was used instead of $Mn_2O_3$.

Example 7

Same as Example 5, wherein $Fe_2O_3$ was used instead of $Mn_2O_3$.

Example 8

Same as Example 2, wherein the surface finish of the metallic alloy before deposition of the coating was pre-oxidized at about 900° C. in an $H_2/H_2O$ atmosphere for 30 min.

Example 9

A small amount of $Ni(NO_3)_2$ was applied onto the interconnect of Example 2 by dip coating the metallic interconnect in a nitrate-solution prior to the formation of the dual-layer coating. The interconnect with the applied $Ni(NO_3)_2$ was pre-oxidized at about 900° C. in air for 24 h.

Example 10

A coating was formed on a Fe—Cr metallic substrate. A layer of stabilized zirconia (e.g. yttria stabilized zirconia) having a fluorite structure was deposited on the metallic substrate by PLD. Afterwards, a thin $MnCr_2O_4$ layer having a spinel structure was deposited on the YSZ layer by PLD so as to form a dual-layer coating. The tracer diffusion coefficient of Ti has been measured to be $5 \times 10^{-16}$ cm$^2$/s at 1200° C. (K. Kowalski et al., Journal of the European Ceramic Society, 20 (2000) p. 951). The tracer diffusion coefficients of other transition metals (e.g. Cr, Fe, and Al) will be of similar magnitude.

Example 11

A dual layer coat was formed on the surface in a Fe22Cr porous metal support for SOFC by a two step impregnation. First a nitrate solution of LaCrO3 is impregnated into the structure by vacuum impregnation. After a subsequent heat treatment to 800° C. a nitrate solution of MnCr2O4 is impregnated. The protective dual coat layer is completed by a heat treatment to 800° C.

Example 12

As Example 11 but using $MnCo_2O_4$ for the second layer.

The coating system of the present application can also be applied as an oxidation resistant coating of metallic substrates for other high temperature (>500° C.) applications than the applications as SOFC and SOEC interconnects outlined above. Alloys utilized for high temperature applications often form a protective silica layer, alumina layer or chromia layer to protect the alloy against further oxidation. By using an oxidation resistant coating, the metallic substrate does not need to be oxidation resistant itself. This means that a larger number of metals and alloys may be used for high temperature applications. Importantly, the coating does not in general need to be electronically conductive for this purpose.

The invention claimed is:

1. A multilayer coating for a metal containing surface of an interconnect of a solid oxide electrolytic device, the coating comprising at least two layers:

a first layer in direct contact with the metal containing surface of the interconnect and a second layer in contact with the surrounding atmosphere, wherein both the first and second layers comprise an oxide; and wherein the first layer has a tracer diffusion coefficient for cations $M^{m+}$, wherein M is a scale forming element of the metal, and the second layer has a tracer diffusion coefficient for oxygen ions $O^{2-}$ satisfying the following formula:

$$\int_{lnp(O_2)_{in}}^{lnp(O_2)_{ex}} \left(D_o + \frac{m}{2}D_M\right) d\ln p(O_2) < 5 \cdot 10^{-13} \text{ cm}^2/s$$

wherein $p(O_2)_{in}$ is the oxygen partial pressure in equilibrium between the metal containing surface and an oxide of M, $p(O_2)_{ex}$ is the oxygen partial pressure in the reaction atmosphere, $p(O_2)$ is the equivalent oxygen partial pressure, $D_M$ is the tracer diffusion coefficient of the metal cations $M^{m+}$ in the first layer, and $D_O$ is the $O^{2-}$ tracer diffusion coefficient in the second layer, wherein the first layer comprises an oxide having a perovskite structure, and the second layer comprises an oxide having a spinel structure, a rock salt structure, a corundum structure, or a wurtzite structure, and wherein the first layer, the second layer, or both, comprises a graded composition such that the composition varies through the layer.

2. The multilayer coating of claim 1, wherein the spinel structure has the formula $AB_2O_4$, wherein A and B are transition metal cations from the first transition metal series of the periodic table, transition metal cations from the second transition metal series of the periodic table, Ce, Al, Ga, Sn, In or mixtures thereof.

3. A multilayer coating suitable for a metal containing surface of an interconnect of a solid oxide electrolytic device, the coating comprising at least two layers:

a first layer in direct contact with the metal containing surface of the interconnect and a second layer in contact with the surrounding atmosphere, wherein both the first and second layers comprise an oxide, wherein the first layer comprises an oxide having a perovskite structure, and wherein the second layer comprises an oxide having a spinel structure, a corundum structure, a wurtzite structure, or a rock salt structure, and wherein the first layer, the second layer, or both, comprises a graded composition such that the composition varies through the layer.

4. The multilayer coating of claim 3, wherein the second layer comprises an oxide having a spinel structure or a rock salt structure.

5. The multilayer coating of claim 1 or 3, wherein the first layer, the second layer, or both, is electrically conducting.

6. The multilayer coating of claim 1 or 3, wherein the perovskite structure has the formula $ABO_3$, wherein A is Y, La, a Lanthanide element, Mg, Ca, Sr, Ba or mixtures thereof, and B is a transition metal from the first transition metal series of the periodic table, a transition metal from the second transition metal series of the periodic table, Ce, Al, Ga, Sn, In or mixtures thereof.

7. A method of forming the multilayer coating of claim 1 or 3, comprising the steps of:

forming the first layer on the metal containing surface; and depositing the second layer on the first layer.

8. The method of claim 7, wherein the first layer and the second layer are formed by slurry coating, spray painting or electrospraying.

9. The method of claim 7, wherein the first layer is formed by depositing the oxide on the metal containing surface by dip-coating, slurry spraying, screen printing, spin coating, PLD, PVD, flame spraying, EPD or spray pyrolysis, and/or wherein the second layer is formed by PLD, PVD or by plasma spraying.

10. The method of claim 7, wherein the first layer is formed by:
   depositing a metal therefor metal salt or metal oxide on the metal containing surface; and
   reacting the metal of the metal containing surface and the metal, metal salt or metal oxide so as to form the first layer.

11. The method of claim 7, wherein the multilayer coating is applied to a porous metal containing surface, wherein the first layer is formed by:
   impregnation of the porous metal containing surface with a metal, metal salt or a metal oxide; and
   reacting the metal of the porous metal containing surface and metal, metal salt or metal oxide so as to form the first layer.

12. The method of claim 7, wherein the second layer is formed by:
   impregnation of the first layer with a metal, metal salt or a metal oxide; and
   reacting the metal, metal salt or metal oxide so as to form the second layer on top of the first layer.

13. The method of claim 10, wherein the deposited metal is La, Sr, or Y.

14. The method of claim 10, wherein the deposited oxide is $Y_2O_3$, SrO, $La_2O_3$, or $La_{1-x}Sr_xCoO_3$.

15. A solid oxide fuel cell stack comprising the multilayer coating of claim 1 or 3.

16. A solid oxide electrolysis cell stack comprising the multilayer coating of claim 1 or 3.

* * * * *